United States Patent
Schillke et al.

(10) Patent No.: US 7,061,626 B1
(45) Date of Patent: Jun. 13, 2006

(54) METHOD OF MANUFACTURING AN OPTICAL ELEMENT USING A HOLOGRAM

(75) Inventors: Frank Schillke, Aalen (DE); Susanne Beder, Aalen (DE); Jochen Hetzler, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/845,251

(22) Filed: May 14, 2004

(51) Int. Cl.
G01B 9/02 (2006.01)

(52) U.S. Cl. .................. 356/513; 356/512; 356/521

(58) Field of Classification Search ............... 356/513, 356/457, 458
See application file for complete search history.

(56) References Cited

U.S. PATENT DOCUMENTS

| | | | |
|---|---|---|---|
| 4,340,306 A | 7/1982 | Balasubramanian | |
| 4,732,483 A | 3/1988 | Biegen | |
| 5,155,553 A * | 10/1992 | Chen | 356/457 |
| 5,361,312 A | 11/1994 | Kuchel | |
| 5,473,434 A | 12/1995 | de Groot | |
| 5,488,477 A | 1/1996 | de Groot | |
| 5,548,403 A | 8/1996 | Sommargren | |
| 5,737,079 A * | 4/1998 | Burge et al. | 356/513 |
| 5,777,741 A | 7/1998 | Deck | |
| 5,982,490 A | 11/1999 | Ichikawa et al. | |
| 6,344,898 B1 | 2/2002 | Gemma et al. | |
| 6,624,895 B1 * | 9/2003 | Moriyasu et al. | 356/513 |
| 2002/0063867 A1 | 5/2002 | Otto | |
| 2002/0170695 A1 * | 11/2002 | Sato et al. | 164/6 |
| 2003/0184762 A1 * | 10/2003 | Kim et al. | 356/512 |
| 2004/0174531 A1 * | 9/2004 | Freimann | 356/512 |

FOREIGN PATENT DOCUMENTS

| | | |
|---|---|---|
| DE | 199 44 021 A1 | 5/2000 |
| JP | 5-1970 A | 5/1993 |
| WO | 198 20 785 A1 | 10/1999 |
| WO | WO 2004/046641 A1 | 6/2004 |

OTHER PUBLICATIONS

A.J. MacGovern et al., *Computer Generated Holograms for Testing Optical Elements*, Applied Optics, Mar. 1971, pp. 619-624, vol. 10, No. 3.

J.C. Wyant et al., *Using Computer Generated Holograms to Test Aspheric Wavefronts*, Applied Optics, Dec. 1972, pp. 2833-2839, vol. 11, No. 12.

J.C. Wyant, et al., *Computer Generated Holograms; Null Lens Test of Aspheric Wavefronts*, Applied Optics, Dec. 1974, pp. 2762-2765, vol. 13, No. 12.

(Continued)

*Primary Examiner*—Gregory J. Toatley, Jr.
*Assistant Examiner*—Denise B Anderson
(74) *Attorney, Agent, or Firm*—Jones Day

(57) ABSTRACT

A method of manufacturing an optical element having an optical surface of a target shape includes performing an interferometric test using an interferometer optics, wherein the interferometer optics includes a hologram that deflects a beam of measuring light by a substantial angle or that displaces an axis of symmetry of measuring light emerging from the hologram with respect to an axis of symmetry of measuring light incident on the hologram.

35 Claims, 8 Drawing Sheets

OTHER PUBLICATIONS

A.F. Fecher et al., *Binäre synthetische Hologramme zur Prüfung asphärischer optischer Elemente*, OPTIK 35, No. 2, 1972, pp. 168-179 (English Abstract on Cover of Publication).

R. Mercier et al., *Comparison Of In-Line And Casrrier Frequency Holograms In Aspheric Testing*, Optics Communications, Jun. 1980, pp. 251-256, vol. 33, No. 3.

D. Malacara, *Twyman-Green Interferometer*, Optical Shop Testing, Ed. D. Malacara, Second Edition 1992, pp. 51-53, Chapter 2.1, John Wiley & Sons, Inc., New York.

D. Malacara, *Variations From The Twyman-Green Configuration*, Optical Shop Testing, Ed. D. Malacara, Second Edition 1992, pp. 73-77, Chapter 2.6, John Wiley & Sons, Inc., New York.

A. Offner et al., *Null Testing Using Compensators*, Optical Shop Testing, Ed. D. Malacara, Second Edition 1992, pp. 427-452, Chapter 12, John Wiley & Sons, Inc., New York.

K. Creath et al., *Holographic and Speckle Tests*, Optical Shop Testing, Ed. D. Malacara, Second Edition 1992, pp. 599-600, Chapter 15.1, John Wiley & Sons, Inc., New York.

K. Creath et al., *Interferometers Using Real Holograms*, Optical Shop Testing, Ed. D. Malacara, Second Edition 1992, pp. 600-603, Chapter 15.2, John Wiley & Sons, Inc., New York.

K. Creath et al., *Interferometers Using Synthetic Holograms*, Optical Shop Testing, Ed. D. Malacara, Second Edition 1992, pp. 603-612, Chapter 15.3, John Wiley & Sons, Inc., New York.

Patrick P. Naulleau et al., *Extreme-ultraviolet phase-shifting point-diffraction interferometer: a wave-front metrology tool with subangstrom reference-wave accuracy*, Applied Optics, Dec. 10, 1999, pp. 7252-7263, vol. 38, No. 35.

E. Curatu et al., *Tolerancing and testing of CGH aspheric nulls*, SPIE vol. 3782, Jul. 1999, pp. 591-600.

* cited by examiner

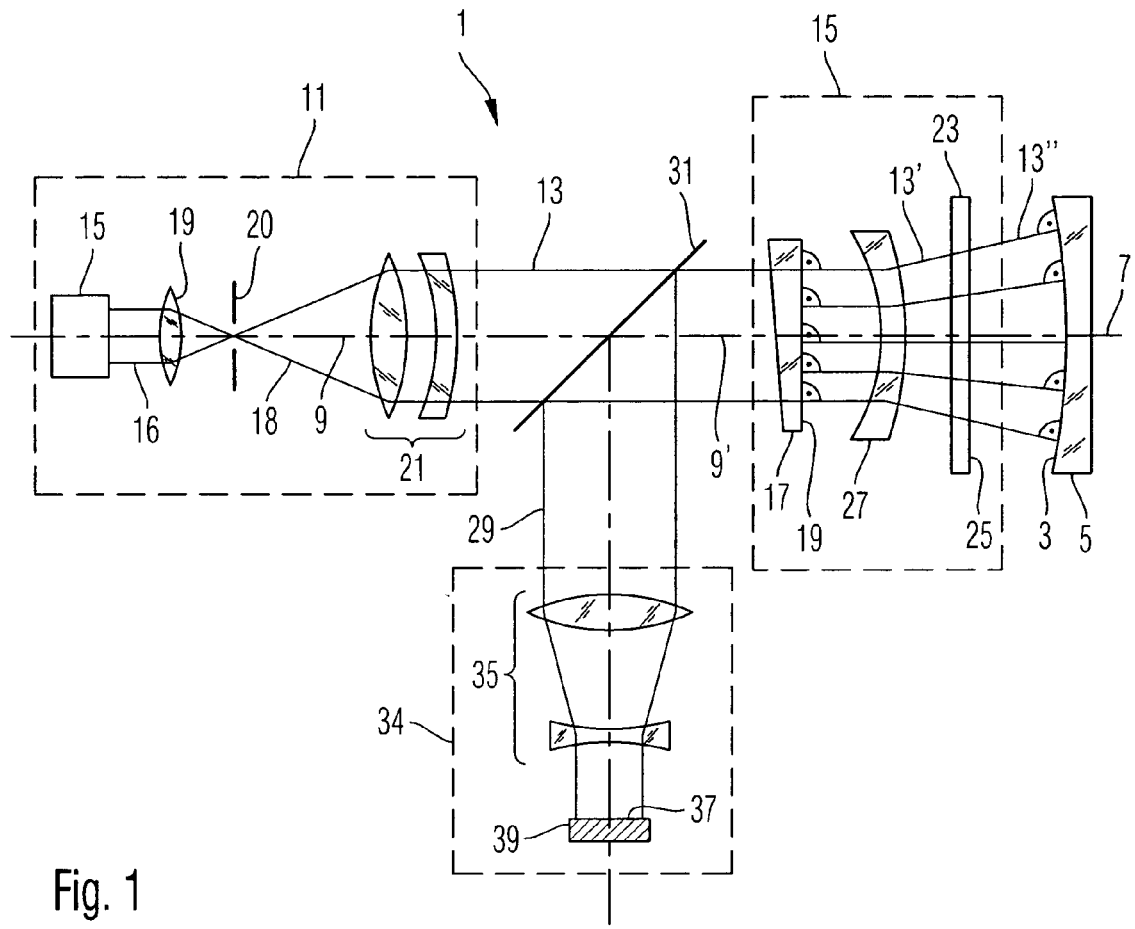
Fig. 1
Related Art
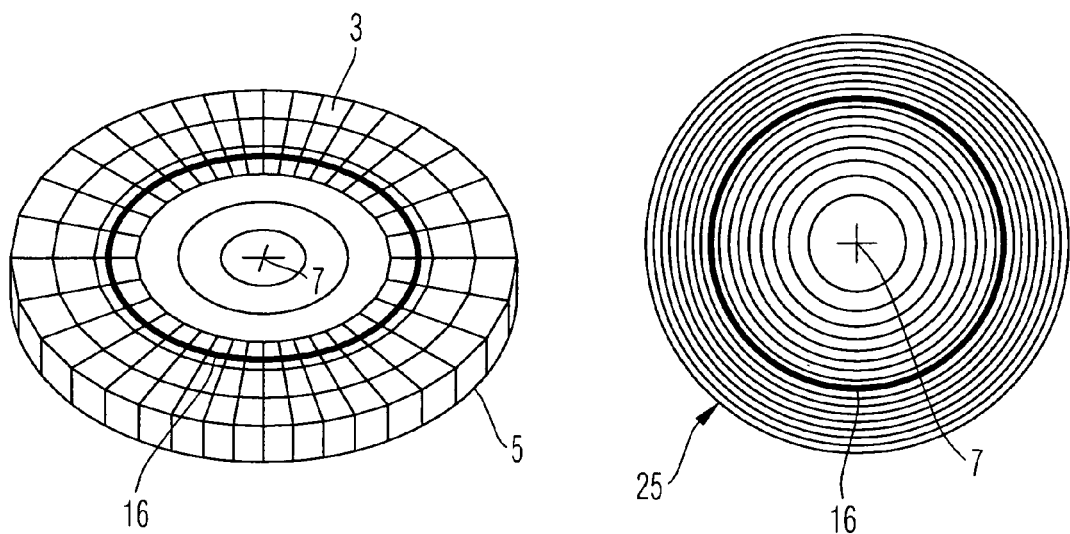
Fig. 2
Related Art
Fig. 3
Related Art

METHOD OF MANUFACTURING AN OPTICAL ELEMENT USING A HOLOGRAM

BACKGROUND OF THE INVENTION

1. Field of the Invention

The present invention relates to a method of manufacturing an optical element. In particular, the invention relates to a method of manufacturing an optical element having an optical surface having a rotational symmetry, and in particular, the optical surface may have an aspherical shape.

2. Brief Description of Related Art

The optical element having the optical surface is, for example, an optical component such as an optical lens or an optical mirror used in optical systems, such as telescopes used in astronomy, and systems used for imaging structures, such as structures formed on a mask or reticle, onto a radiation sensitive substrate, such as a resist, in a lithographic method. The success of such an optical system is substantially determined by the accuracy with which the optical surface can be machined or manufactured to have a target shape determined by a designer of the optical system. In such manufacture it is necessary to compare the shape of the machined optical surface with its target shape, and to determine differences between the machined and target surfaces. The optical surface may then be further machined at those portions where differences between the machined and target surfaces exceed e.g. predefined thresholds.

Interferometric apparatuses are commonly used for high precision measurements of optical surfaces. Examples of such apparatus are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477. The entire contents of these documents are incorporated herein by reference.

The conventional interferometer apparatus for measuring a spherical optical surface typically includes a source of coherent light and an interferometer optics for generating a beam of measuring light incident on the surface to be tested, such that wavefronts of the measuring light have, at a position of the surface to be tested, a same shape as the target shape of the surface under test. In such a situation, the beam of measuring light is orthogonally incident on the surface under test, and is reflected therefrom to travel back towards the interferometer optics. Thereafter, the light of the measuring beam reflected from the surface under test is superimposed with light reflected from a reference surface and deviations of the shape of the surface under test and its target shape are determined from a resulting interference pattern.

While spherical wavefronts for testing spherical optical surfaces may be generated with a relatively high precision by conventional interferometer optics, more advanced optics, which are also referred to as compensators, null lens arrangements, or K-systems, are necessary to generate beams of measuring light having aspherical wavefronts such that the light is substantially orthogonally incident at each location of the aspherical surface under test. Background information relating to null lens arrangements or compensators is available e.g. from the text book of Daniel Malacara "Optical Shop Testing", $2^{nd}$ Edition, John Wiley & Sons, Inc. 1992, Chapter 12.

The compensator for generating the aspherical wavefronts may comprise one or more refractive optical elements, such as lenses. It is also known to use a diffractive element such as a hologram in a compensator for generating the aspherical wavefronts. Background information and examples of using holograms in interferometric measurements are illustrated in Chapters 15.1, 15.2, and 15.3 of the text book of Daniel Malacara mentioned above. The hologram may be a real hologram generated by exposing a suitable material, such as a photographic plate, with interfering light beams, or a synthetic hologram, such as a computer generated hologram (CGH) generated by simulating the interferometer set up by a suitable computational method, such as ray tracing, and producing the hologram by manufacturing steps using a pen plotter and optical reduction, lithographic steps, laser beam recorders, electron beam recorders and others.

It has been found that the conventional methods of testing an optical surface using a hologram have an insufficient accuracy in some applications.

SUMMARY OF THE INVENTION

The present invention has been accomplished taking the above problems into consideration.

Thus, it is an object of the present invention to provide a method of testing and manufacturing an optical element having an optical surface of a high accuracy. Further, it is an object of the present invention to provide a method of testing and manufacturing an optical element having an aspherical surface of a relatively high accuracy.

The forgoing objects are accomplished by providing a method comprising testing an optical element by using an interferometer optics having at least one diffractive optical element or hologram for generating a beam of measuring light having suitable wavefronts for testing the optical surface of the optical element to be manufactured.

The hologram is disposed in the beam path of the beam of measuring light upstream of the optical surface to be tested, such that the beam of measuring light traverses the hologram and is incident on the optical surface thereafter. The hologram does not have a rotational symmetry, even though an optical axis or an axis of rotational symmetry may be assigned to the optical surface to be tested. Thus, the hologram will not allow an interferometer set up in which the beam of measuring light traversing the hologram has an overall rotational symmetry. It might be understood that such breach of symmetry will reduce a final accuracy in testing the optical surface. However, usage of holograms which are not rotationally symmetric allows for possible designs of the hologram which allow for an increased accuracy of manufacture of the hologram, such that the aspherical wavefronts finally generated by the compensator having the hologram will correspond with a relatively high accuracy to those desired wavefronts for which the hologram is designed.

According to an aspect of the invention, the beam of measuring light traverses a beam deflector and a deflecting hologram, which deflects the beam of measuring light, before the measuring light is incident on the optical surface. Since the hologram substantially deflects the beam of measuring light, the hologram has a corresponding high line density. Such a type of hologram is also referred to in the art as a carrier frequency hologram. In the sense of the present invention, the deflecting hologram or carrier frequency hologram provides a substantial deflection for the beam of measuring light diffracted into the used diffraction order. It is to be understood that a substantial deflection is characterized by an angle between an average of all directions of light rays incident on the hologram, and an average over all directions of light rays of the beam of measuring light emerging from the hologram being greater than a minimum angle such as 0.25°. Other examples for minimum angles may be 0.5°, 0.75° and others.

The deflection of the beam of measuring light induced by the hologram is compensated by the beam deflector, which, according to one exemplary embodiment, may comprise a prism. According to other embodiments, the deflector comprises a lens, a mirror or other, such as combinations of two or more deflectors of a same or different type, such as a prism or a lens or a mirror.

A deflection angle between the measuring light incident on the deflector and the measuring light emerging from the deflector is a substantial deflection angle greater than a minimum angle such as 0.12°, 0.25° and higher angles.

Due to the basic underlying carrier frequency of the hologram, differences between a highest and a lowest line density of the hologram may be relatively small as compared to a hologram having a rotational symmetry were line densities may be close to zero at a center of the hologram.

Further, for the optical surface having a rotational symmetry, locations on the optical surface at plural angular positions and at same distances from the axis of rotational symmetry will correspond to locations of different line densities on the hologram. By testing the optical surface at plural rotational positions about the axis of symmetry and performing an averaging over the plural measuring results, errors contributed to differences in line densities of the hologram may be reduced by the averaging.

According to a further aspect of the invention, the beam of measuring light traverses a hologram disposed upstream of the optical surface to be tested, the hologram is a deflecting hologram which substantially deflects the beam of measuring light. The hologram is provided on a surface of a substrate facing towards the optical surface to be tested, and the hologram is disposed in the beam of light such that an axis of rotational symmetry of the optical surface intersects a plane of the hologram such that an angle between the axis of symmetry and the plane of the hologram in a region about a point of intersection between the hologram and the axis is about 90°.

The deflecting hologram is a carrier frequency hologram. The orientation such that the hologram is substantially orthogonal to the axis of symmetry of the optical surface includes that the hologram is slanted with respect to the beam of measuring light incident on the hologram. Compared to a situation where the hologram is orthogonal to the incident beam of measuring light or a situation where the hologram is provided on a substrate surface oriented away from the substrate to be tested, the above orientations allows for a more accurate computation of the wavefronts generated by the hologram, based on methods such as ray tracing.

According to a further aspect of the invention, the beam of measuring light traverses at least one lens of the interferometer optics having a first axis of rotational symmetry. The hologram is disposed downstream of the at least one lens in the beam path of the beam of measuring light, and the optical surface to be tested is disposed downstream of the hologram in the beam path of the beam of measuring light. The optical surface to be tested has a second axis of rotational symmetry which is substantially parallel to and disposed at a distance from the first axis of rotational symmetry of the at least one lens of the interferometer optics.

According to an exemplary embodiment of the invention, the interferometric measurement includes herein taking plural interferometric measurements wherein the optical surface to be tested is rotated about the second axis of rotational symmetry between successive measurements.

Exemplary embodiments to all of the above mentioned aspects comprise disposing refractive elements in the beam path, upstream or downstream of the hologram. Such a refractive element may contribute to the generation of the wavefronts in the beam of measuring light incident on the optical element to be tested, wherein the refractive element provides additional power which is not to be provided by the hologram. This may contribute to a more uniform line density of the hologram.

According to an exemplary embodiment under the above aspects of the invention, the interferometric measurement of the optical surface is performed with measuring light reflected from the optical surface to be tested. According to an alternative embodiment, the interferometric measurement is performed with light having traversed the optical surface to be tested.

According to a further exemplary embodiment, the optical surface to be tested is an aspherical surface having substantial deviations from a spherical shape. Within the context of the present application, an optical surface may be referred to as an aspherical surface if the aspherical surface differs from its best approximating sphere by more than a predetermined criterion. One such criterion is based on a gradient of the difference between the aspherical surface and its best approximating sphere, and the optical surface is referred to as an aspherical surface if such gradient exceeds a value of 6 µm divided by an effective diameter of the optical surface.

The machining of the optical surface may comprise a machining such as, for example, milling, grinding, loose abrasive grinding, polishing, ion beam figuring, magnetorheological figuring, and finishing of the optical surface of the optical element.

According to an embodiment, the finishing comprises applying a coating to the optical surface. The coating may comprises a coating such as a reflective coating, an anti-reflective coating and a protective coating.

BRIEF DESCRIPTION OF THE DRAWINGS

The forgoing as well as other advantageous features of the invention will be more apparent from the following detailed description of exemplary embodiments of the invention with reference to the accompanying drawings, wherein:

FIG. 1 illustrates an interferometer system for testing an optical element according to a comparative example in which a rotationally symmetric hologram is used;

FIG. 2 is a perspective view of an optical element to be tested with the interferometer system of FIG. 1;

FIG. 3 is a schematic illustration of a line density distribution of the hologram used in the interferometer system of FIG. 1 for testing the optical element shown in FIG. 2;

DETAILED DESCRIPTION OF EXEMPLARY EMBODIMENTS

Figure 4:
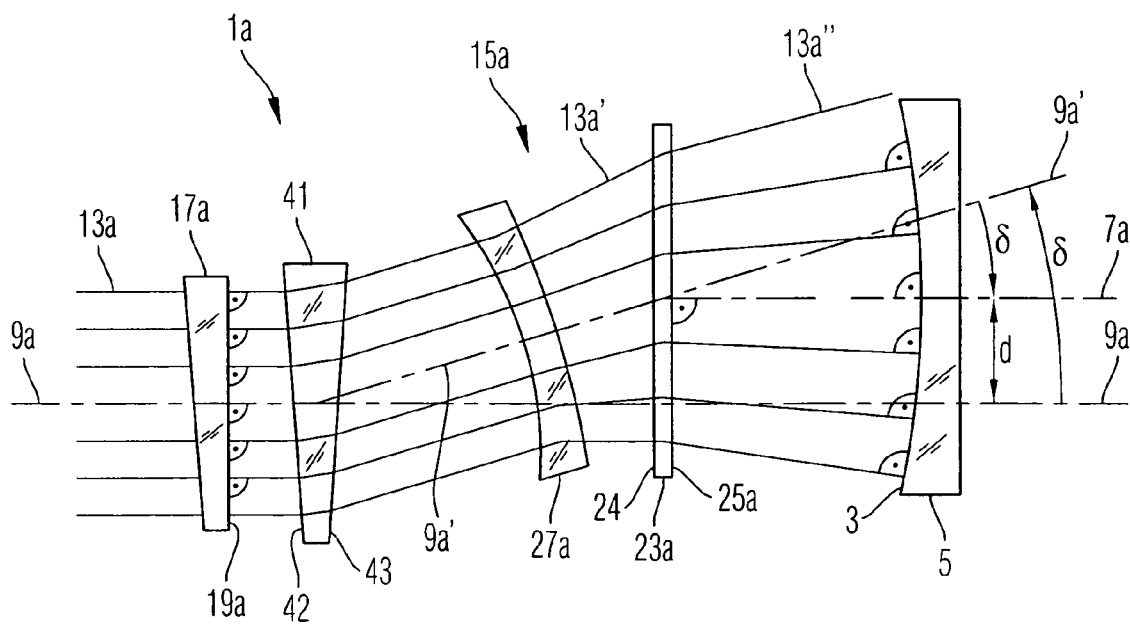
FIG. 4 illustrates a portion of an interferometer system, similar to that shown in FIG. 1, according to an embodiment of the invention for testing the optical element shown in FIG. 2.

In the exemplary embodiments described below, components that are alike in function and structure are designated as far as possible by like reference numerals. Therefore, to understand the features of the individual components of a specific embodiment, the descriptions of other embodiments and of the summary of the invention should be referred to.

The exemplary embodiments of methods described below involve interferometrically taking measurements of wavefronts generated by reflecting an incident beam of measuring light provided by an interferometer apparatus from surfaces to be measured. Plural conventional interferometric methods may be used as a basis for taking such measurements. Examples of such interferometric methods are disclosed in e.g. U.S. Pat. No. 5,361,312, U.S. Pat. No. 5,982,490 and U.S. 2002/0063867 A1. The entire contents of these patents and publications are incorporated herein by reference.

For illustrating the particularities of embodiments of the present invention, a conventional interferometer system having a rotationally symmetric hologram is first illustrated with reference to FIGS. 1 to 3. FIG. 1 shows the interferometer system 1, FIG. 2 shows an optical element 5 to be tested with interferometer system 1 shown in FIG. 1, and FIG. 3 illustrates a line density of a hologram 25 used in the interferometer system 1.

The interferometer system 1, shown in FIG. 1, is used for testing an aspherical mirror surface 3 of a mirror 5. The mirror surface 3 has a rotationally symmetric shape about an axis of symmetry 7.

The interferometer system 1 comprises a light source 11 for generating beam 13 of measuring light. The light source 11 comprises a helium neon laser 15 emitting a laser beam 16. Beam 16 is focused by a focusing lens 19 onto a pin hole aperture of a spatial filter 20 such that a diverging beam 18 of coherent light emerges from the pin hole. Wavefronts in diverging beam 18 are substantially spherical wavefronts. The diverging beam 18 is collimated by a group of lenses 21 having an optical axis 9, to form the parallel beam 13 of measuring light having substantially flat wavefronts. Beam 13 traverses an interferometer optics 15 which transforms and shapes the beam 13 of measuring light such that the beam 13" supplied by the interferometer optics 15 and incident on the optical surface 3 has wavefronts of a shape which corresponds to a target shape of optical surface 3 at each position thereof. Thus, if the optical surface 3 is machined such that its surface shape corresponds to the target shape, the light of beam 13" is orthogonally incident on the optical surface 3 at each location thereof. The light reflected from the optical surface 3 will then travel back exactly the same way as it was incident on the optical surface 3, traverse the interferometer optics 15, and a portion thereof will be reflected from a beam splitter 31 disposed in the portion of the beam 13 of measuring light where beam 13 is the parallel beam having the flat wavefronts. A beam 29 reflected from the beam splitter 31 is imaged onto a photo sensitive surface 37 of a camera chip 39 through an objective lens system 35 of a camera 34, such that the optical surface 3 is imaged onto the camera 39.

The interferometer optics 15 comprises a wedge shaped substrate 17 having a flat surface 19 which is oriented orthogonally to the parallel beam 13 of measuring light having traversed substrate 17. Surface 19 forms a Fizeau surface of interferometer system 1 in that it reflects a portion of the beam 13 of measuring light. The reflected portion of the beam 13 of measuring light forms reference light for the interferometric method. The reference light reflected back from Fizeau surface 19 travels back a same path as it was incident on surface 19, and is thus superimposed with the measuring light reflected from optical surface 3. The reference light is also deflected by beam splitter 31 and imaged onto the photo sensitive surface 37 of camera 39, such that an interference pattern generated by superimposing the wavefronts reflected from the optical surface 3 and the wavefronts reflected back from Fizeau surface 19 may be detected by camera 39.

As mentioned above, the interferometer optics 15 is designed such that it transforms the entering beam 13 of measuring light having the parallel wavefronts into the beam 13" of measuring light having the aspherical wavefronts at the position of the optical surface 3. For this purpose, the interferometer optics 15 comprises a lens 27 transforming beam 13 into a diverging beam 13' and a substrate 23 having two parallel flat surfaces wherein one surface 25 disposed opposite to the optical surface 3 carries the hologram 25. The hologram 25 is designed such that it diffracts the beam 13' having the spherically diverging wavefronts exactly such that the wavefronts in the beam 13" at the position of the optical surface 3 will have a shape which substantially corresponds to the target shape of the optical surface 3. The hologram 25 may be generated by exposing a photographic plate to reference light and light reflected from an optical surface having a surface corresponding to the target shape to a high accuracy, or, the hologram may be a computer generated hologram (CGH) generated by calculating a corresponding grating using a computer, involving methods such as ray tracing and plotting the calculated grating on surface 25 of the substrate. The grating may be formed by a lithographic method, for example. Background information with respect to holograms used in interferometry may be obtained from Chapter 15 of the above mentioned text book of Daniel Malacara.

Lens 27 disposed in parallel beam 13 is rotationally symmetric about an axis of rotation 9' which coincides with the axis of symmetry 7 of optical surface 3. Thus, lens 27, hologram 25 and optical surface 3 form a group of optical components each of which is rotationally symmetric about a common axis 9', 7. FIG. 3 is an illustration of a line density distribution of hologram 25. The line density continuously increases from zero at center 7 of hologram 25 to several hundred, possibly several thousand lines per mm at a periphery of hologram 25, depending on a local slope of the optical surface at its periphery. FIG. 2 further indicates a circular line 16 of points on the optical surface 3 having a constant distance from axis 7. FIG. 3 indicates a mapping of line 16 corresponding to line 16 shown in FIG. 2, and it appears that each point of the optical surface having a same distance from the axis of symmetry thereof is associated with a same line density of the hologram, independent of an azimuthal orientation of that point about axis 7. In such a configuration, systematic errors in generating the hologram and depending on the local line density thereof will result in rotational symmetric errors when determining the shape of optical surface 3 from the interferometric measurement.

FIG. 4 shows a portion of an interferometer system 1a according to an embodiment of the invention for testing optical surface 3 of optical element 5 shown in FIG. 2. The interferometer system 1a is similar to that shown in FIG. 1 and differs therefrom in the configuration of the interferometer optics for generating a beam 13a" orthogonally incident on optical surface 3.

The interferometer optics 15a comprises a slightly wedge shaped plate 17a providing Fizeau surface 19a of the interferometer system 1a and a prism 41 having flat surfaces 42 and 43 disposed in beam 13a downstream of Fizeau surface 19a. Prism 41 deflects beam 13a by an angle δ, and the beam of measuring light will have substantially flat wavefronts downstream of prism 41. A lens 27 is disposed downstream of prism 41 to transform beam 13a into a diverging beam 13a' having substantially spherical wavefronts. Beam 13a' traverses a substrate plate 23a having a first surface 24 facing towards the lens 27a, and a second surface 25a facing away from the lens 27a. A hologram is provided on surface 25a of the plate 23a. Hologram 25a is designed such that it deflects beam 13a' by an angle δ, and modifies the spherical wavefronts of beam 13a' to have aspherical wavefronts in beam 13a" such that the light of beam 13a" is orthogonally incident on optical surface 3. Thus, an amount of deflection caused by hologram 25a is substantially the same as the amount of deflection caused by prism 41, and an axis of rotation 7a of optical surface 3 is parallel to an optical axis 9a of lenses disposed upstream in beam 13a incident on Fizeau surface 19a, wherein axis 7a is arranged at a distance d from axis 9a.

Figure 5:
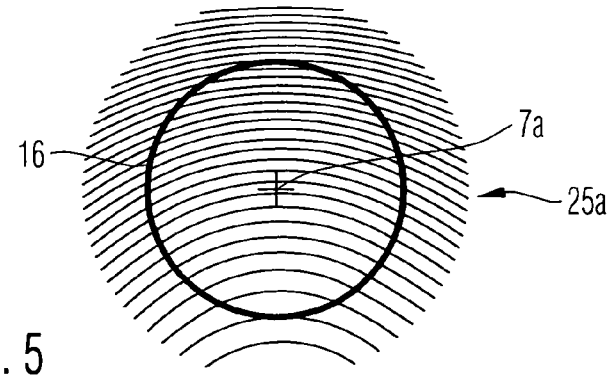
FIG. 5 is a schematic illustration of a line density distribution of the hologram used in the interferometer system of FIG. 1 for testing the optical element shown in FIG. 4.

Hologram 25a deflects each portion of beam 13a' in a same direction. FIG. 5 illustrates a distribution of local line densities of hologram 25a. Typically, line densities continuously are within a range of about 50 lines per mm to about 600 lines per mm. A relative change of the line densities over the whole surface of the hologram is reduced as compared to the hologram shown in FIG. 3. This results in a reduced contribution of a systematic error resulting from line density errors in hologram 25a.

The angle δ of deflection of the beam by hologram 25a is an average angle of deflection calculated by averaging directions of the light rays of beam 13a', averaging directions of the light rays of beam 13a" and calculating the angle between the averaged directions. The averaging may comprise calculating an arithmetic average of the ray directions of the respective beam, or any other suitable method of calculating an average of directions.

A phase function of the hologram 25a may be represented by the formula $$\Phi(x, y) = \sum_i A_i \cdot (x^2 + y^2)^i + C \cdot y \quad i = 1, 2, \ldots,$$

wherein $A_i$ represents coefficients of a rotationally symmetric portion of the phase function and C represents a coefficient depending on the angle δ.

FIG. 5 further indicates a mapping of line 16 of points on surface 3 having a same distance from its axis of symmetry. It appears that line densities corresponding to these points change with an azimuthal angle about axis 7a. Remaining errors resulting from changes in line densities in the interferometric measurement may be averaged out by performing plural interferometric measurements of optical surface 3 at different orientations of optical surface 3 about its axis of rotation 7a. For this purpose optical element 5 is mounted on a test piece holder (not shown in FIG. 4) rotatable about axis 7a. Further, hologram 25a is disposed such in the beam path that the axis of rotation 7a of optical surface 3 is substantially orthogonal to a plane of extension of hologram 25a in a region about a point of intersection of axis 7a and hologram 25a. In particular, the whole surface of the hologram is orthogonal to axis 7a since hologram 25a is provided on the flat surface of substrate 23a. Such orientation of the hologram is particularly useful in reducing computation errors when calculating the line density distribution of the hologram such that the measuring light is orthogonally incident on the optical surface 3 to be tested. The orientation of the axis 7a with respect to the plane of the hologram is sufficiently close to 90° such that deviations from that angle will not introduce measuring errors limiting the achievable measuring accuracy.

Figure 6:
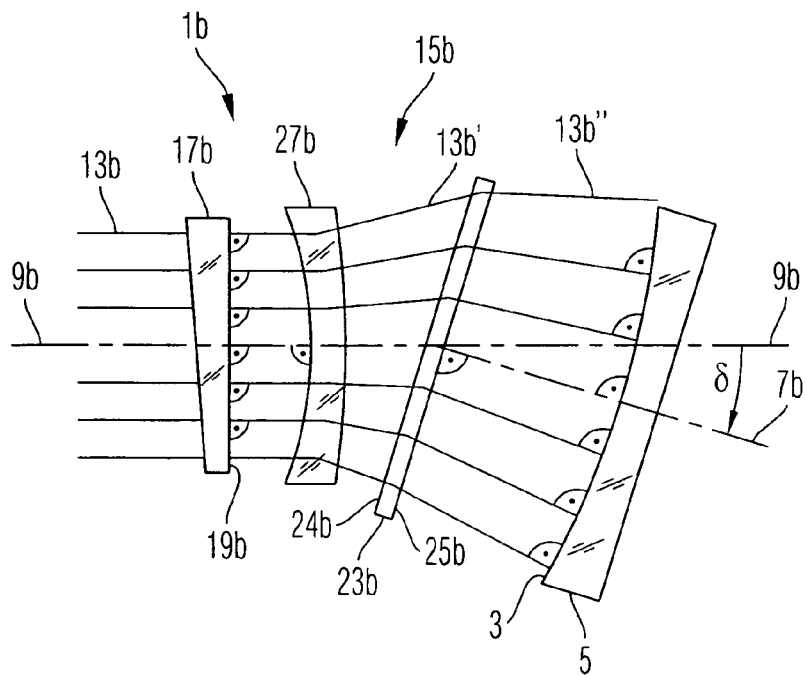
FIG. 6 illustrates a portion of an interferometer system, similar to that shown in FIG. 1, according to a further embodiment of the invention for testing the optical element shown in FIG. 4.

FIG. 6 shows a further embodiment using an interferometer system 1b for testing the optical surface 3 of optical element 5 shown in FIG. 2. The interferometer system 1b of FIG. 6 differs from that shown in FIG. 4 in that a prism for deflecting the beam of measuring light by an angle corresponding to an angle δ of deflection of the hologram is not disposed in the beam path of the beam of measuring light. An interferometer optics 15b of interferometer system 1b shown in FIG. 6 comprises a Fizeau surface 19b, a refractive lens 27b, and a hologram 25b to generate a beam 13b" of measuring light which is orthogonally incident on optical surface 3. The hologram 25b has a line density distribution similar to that shown in FIG. 5, and the hologram 25b is oriented substantially orthogonal to an axis 7b of symmetry of optical surface 3.

Figure 7:
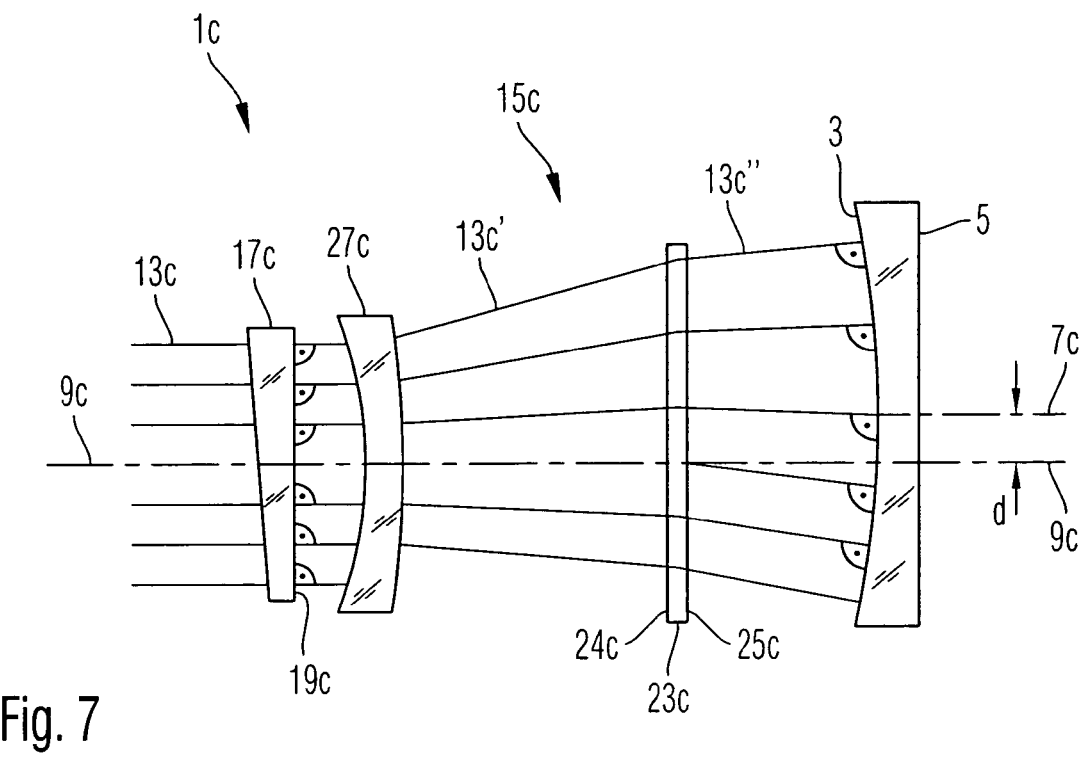
FIG. 7 illustrates a portion of an interferometer system, similar to that shown in FIG. 1, according to a further embodiment of the invention for testing the optical element shown in FIG. 4.

FIG. 7 shows a portion of a further embodiment of an interferometer system 1c, suitable for testing optical surface 3 of the optical element 5 shown in FIG. 2. An interferometer optics 15c of interferometer system 1c comprises a Fizeau surface 19c, a diverging lens 27c and a hologram 25c for generating a beam 13c" of measuring light which is orthogonally incident on optical surface 3. Lens 27c transforms parallel beam 13c to be a diverging beam 13c' having substantially spherical wavefronts which are rotationally symmetric with respect to an optical axis 9c of lens 27c. Hologram 25c is designed such that it transforms beam 13c' into beam 13c" having aspherical wavefronts of rotational symmetry with an axis of symmetry 7c which is oriented parallel with axis 9c and is displaced therefrom by a distance d.

Figure 8:
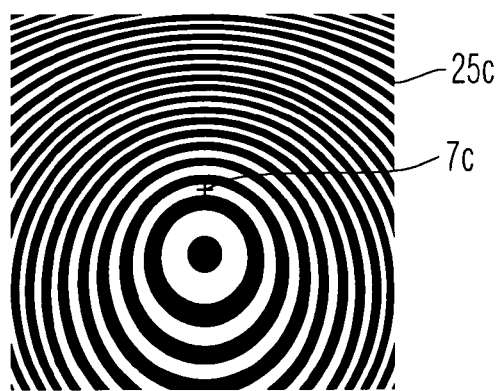
FIG. 8 is a schematic illustration of a line density distribution of the hologram used in the interferometer system of FIG. 4 for testing the optical element shown in FIG. 7.

FIG. 8 is an illustration indicating a line density distribution of hologram 25c. The line density distribution is not rotationally symmetric and has a line density different from zero on axis 7c of optical surface 3. Hologram 25c has a region spaced apart from axis 7c where the line density is considerably low. By taking plural interferometric measurements of optical surface 3 at different rotational positions thereof about axis 7c, it is possible to test each location on optical surface 3 with plural corresponding line densities of the hologram 25c such that an average line density of testing is different from zero at each location, and that a variation of averaged line densities across the whole surface of optical surface 3 is reduced as compared to a hologram as illustrated in FIG. 3.

A phase function of hologram 25c may be represented by the following formula $$\Phi(x, y) = \sum_i \left( A_i \cdot (x^2 + y^2)^i + B_i \cdot (x^2 + (y-d)^2)^i \right) \quad i = 1, 2, \ldots,$$

wherein $A_i$ are coefficients representing the wavefronts of beam 13c' incident on the hologram, and $B_i$ are coefficients of the wavefronts of beam 13c" emanating from the hologram, and d is the distance between axis 7c and 9c.

Figure 9:
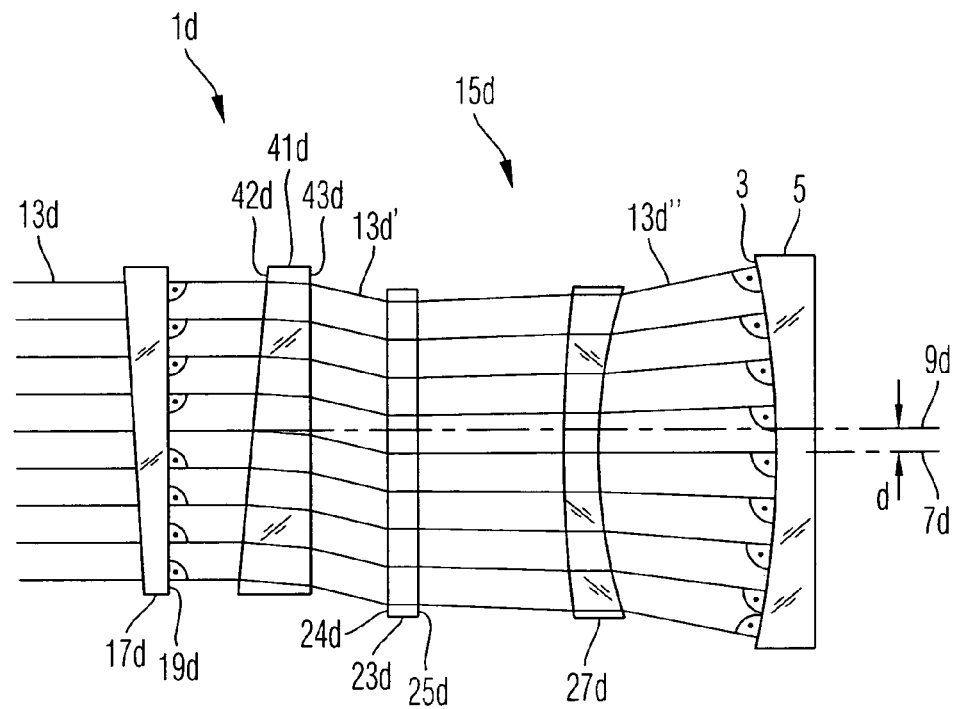
FIGS. 9–15 illustrate portions of interferometer systems, similar to that shown in FIG. 1, according to further embodiments of the invention for testing optical elements shown in FIG. 6.

FIG. 9 illustrates a portion of an interferometer system 1d similar to that shown in FIG. 4. An interferometer optics 15d comprises a prism 41d for deflecting the beam of measuring light by an angle corresponding to an angle of deflection generated by a hologram 25d disposed in the beam path of measuring light upstream of optical surface 3 of optical element 5 to be tested. Further, a lens 27d contributing to diverging the beam of measuring light is disposed upstream of the optical surface 3. However, different from the embodiment shown in FIG. 4, lens 27d is disposed downstream of hologram 25d.

Figure 10:
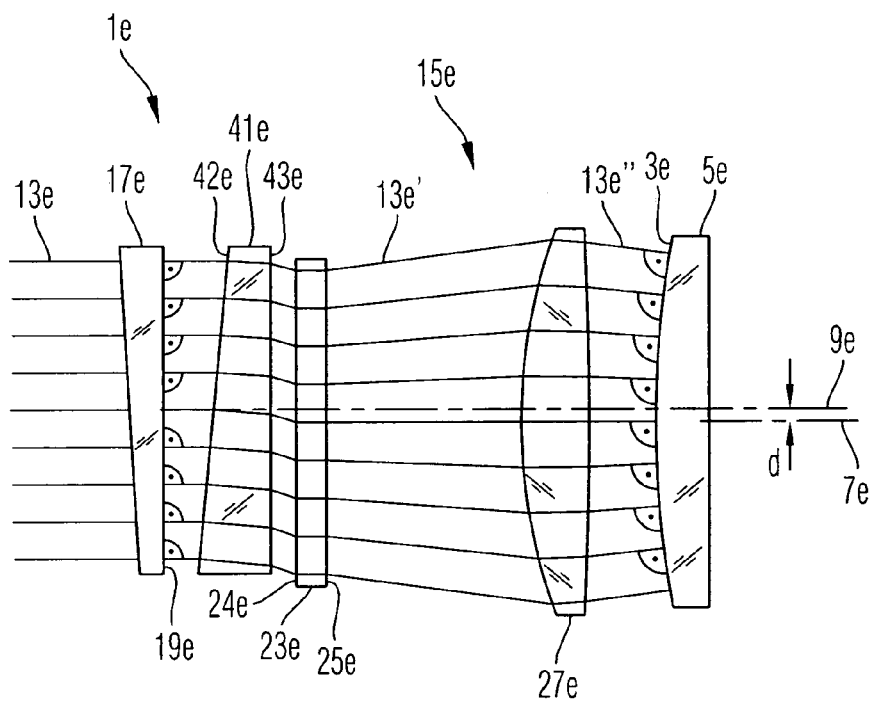

FIG. 10 shows a further embodiment of an interferometer system 1e having an interferometer optics 15e including a prism 41e for deflecting the beam of measuring light by an angle corresponding to an angle of deflection generated by a hologram 25e. In addition to the deflecting function of hologram 25e, hologram 25e also diverges the parallel beam of measuring light incident on hologram 25e. Further, the interferometer optics 15e comprises a lens 27e disposed downstream of hologram 25e in the beam path of the measuring light. The lens 27e has a positive refractive power which is greater than the diverging diffractive power of hologram 25e such that the beam 13e" incident on an optical surface 3e to be tested is a converging beam and such that the light of beam 13e" is orthogonally incident on each location of surface 3e which is a convex surface, accordingly.

Figure 11:
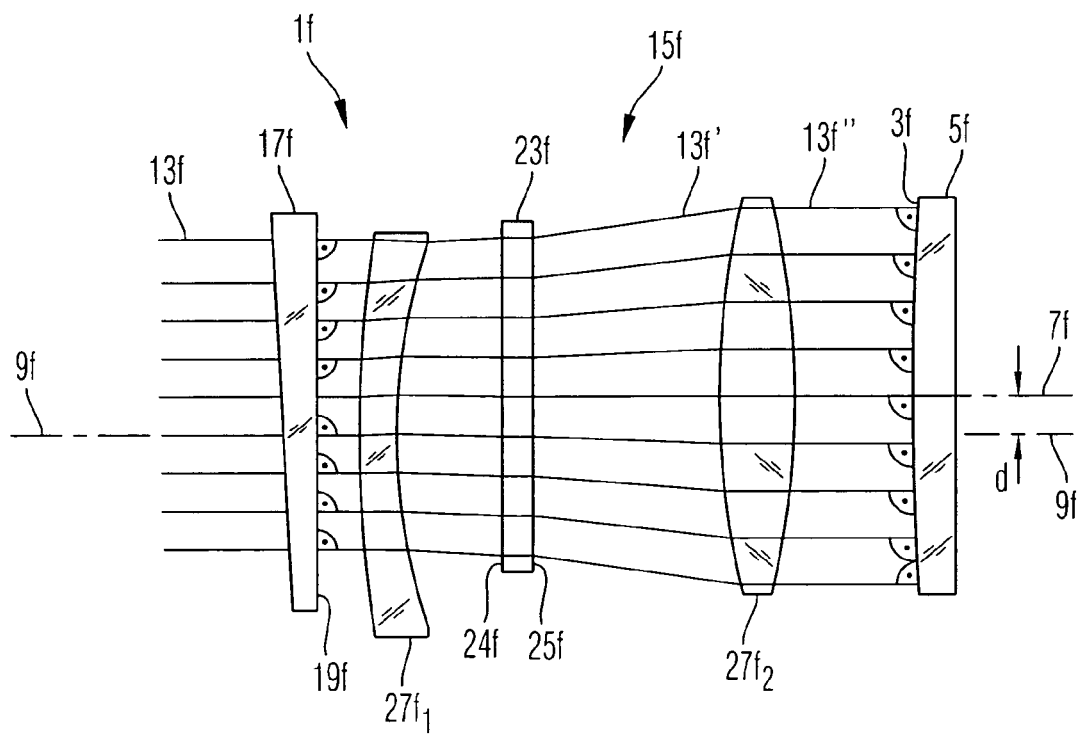

FIG. 11 shows a further embodiment of an interferometer system 1f for testing an optical surface 3f of an optical element 5f having an axis of rotation 7f. An interferometer optics 15f for generating a beam of measuring light 13f''' orthogonally incident on optical surface 3f at each location thereof comprises a Fizeau surface 19f, a diverging lens $27f_1$ having an optical axis 9f, a hologram 25f and a converging lens $27f_2$ having an optical axis coinciding with axis of rotation 7f of optical surface 3f. Axis 7f is oriented parallel to axis 9f and spaced by a distance d therefrom. Hologram 25f is of a type illustrated with reference to FIG. 8 above.

Figure 12:
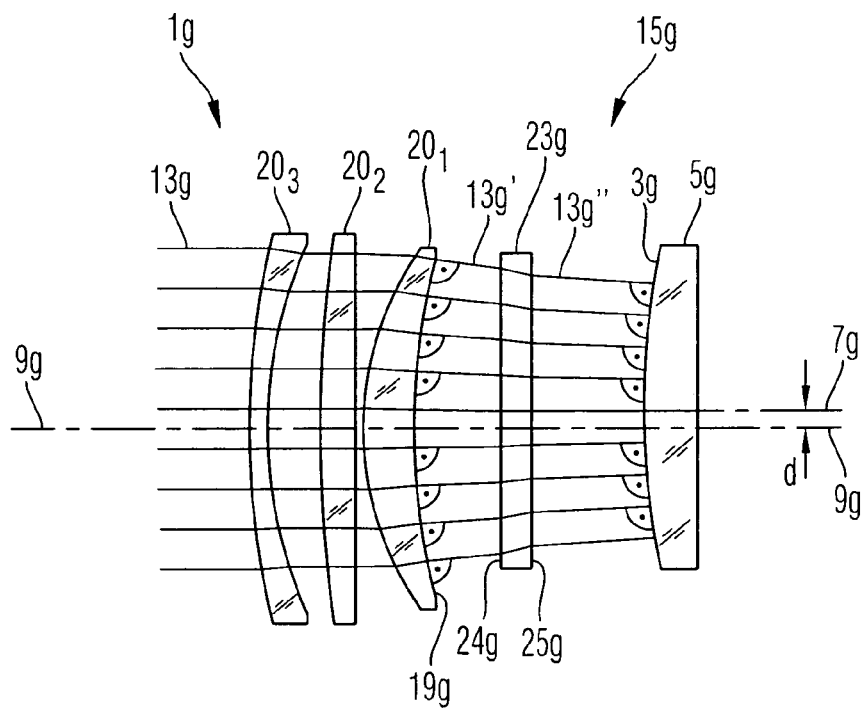

FIG. 12 illustrates a portion of an interferometer system 1g used for testing a convex optical surface 3g having an axis of symmetry 7g. An interferometer optics 15g comprises a Fizeau surface 19g provided on a concave surface of a lens $20_1$ such that a beam 13g' of measuring light traversing Fizeau surface 19g is a converging beam having spherical wavefronts. Two lenses $20_2$ and $20_3$ are disposed upstream of lens $20_1$, and beam 13g incident on lens $20_3$ is a parallel beam having substantially flat wavefronts.

Converging beam 13g' is incident on a hologram 25g of a type as illustrated with reference to FIG. 8 above. Hologram 25g modifies the spherical wavefronts of beam 13g' such that beam 13g" emanating from hologram 25g has aspherical wavefronts with an axis of rotational symmetry which coincides with axis 7g of optical surface 3g and is displaced from an optical axis 9g of lenses $20_1, 20_2, 20_3$ by a distance d.

Figure 13:
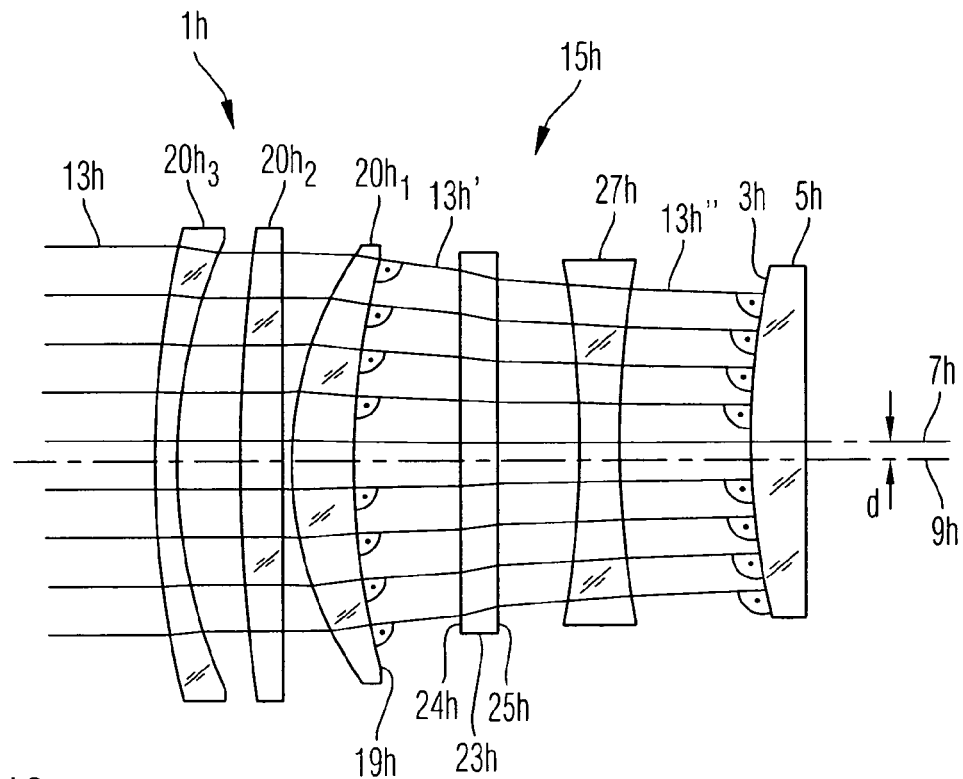

FIG. 13 shows a portion of a further embodiment of an interferometer system 1h having an interferometer optics 15h comprising a Fizeau surface 19h disposed on a concave surface of a lens $20h_1$, such that a beam 13h' of measuring light incident on a hologram 25h is a converging beam having spherical wavefronts. Different from the embodiment shown in FIG. 12, a diverging lens 27h is disposed in the beam path between hologram 25h and optical surface 3h to be tested. An optical axis of lens 27h coincides with an axis of rotation 7h of optical surface 3h and is parallel displaced by a distance d from an optical axis 9h of Fizeau surface 19h. Hologram 25h is of a type as illustrated with reference to FIG. 8 above.

In the embodiments illustrated with reference to FIGS. 4 to 13 above, the light used for the interferometric measurements is measuring light reflected from the optical surfaces to be tested.

Figure 14:
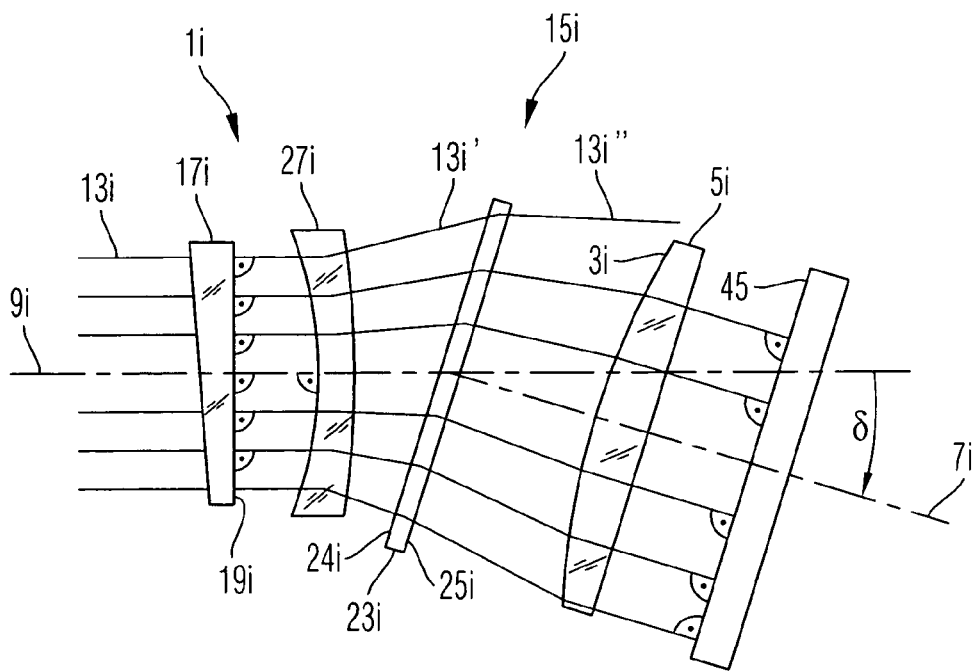

FIG. 14 illustrates an embodiment where the light used for the interferometric measurement and superimposed with reference light traverses an optical surface 3i of an optical element 5i to be tested. For this purpose, similar to the embodiment shown in FIG. 6, an interferometer optics 15i of an interferometer system comprises a Fizeau surface 19i, a diverging lens 7i and a hologram 25i. The hologram 25i is of a type as illustrated with reference to FIG. 5 such that a beam 13i' of measuring light is deflected by the hologram 25i by an angle δ.

The optical surface 3i to be tested is disposed downstream of hologram 25i, and the measuring light traverses optical surface 3i and the whole optical element 5i, which is a lens, such that the light having traversed optical element 5i is orthogonally incident on an flat mirror 45. The light incident on the mirror 45 travels back, traversing optical element 5i, hologram 25i, lens 27i and Fizeau surface 19i, where the light is superimposed with reference light reflected from 19i.

The hologram 25i is designed such that the beam 13i' emerging from the hologram is transformed by the optical element 5i having an optical surface 3i of the target shape to the parallel beam which is orthogonally incident on mirror 45.

In the embodiment illustrated in FIG. 14 the optical surface 3i is tested in transmission, i.e. the measuring light which is used for interfering with the reference light has transmitted the optical surface. Each of the embodiments shown in FIGS. 4, 7, 9, 10, 11, 12 and 13 may be modified such that the beam of measuring light traverses the optical surface to be tested.

Figure 15:
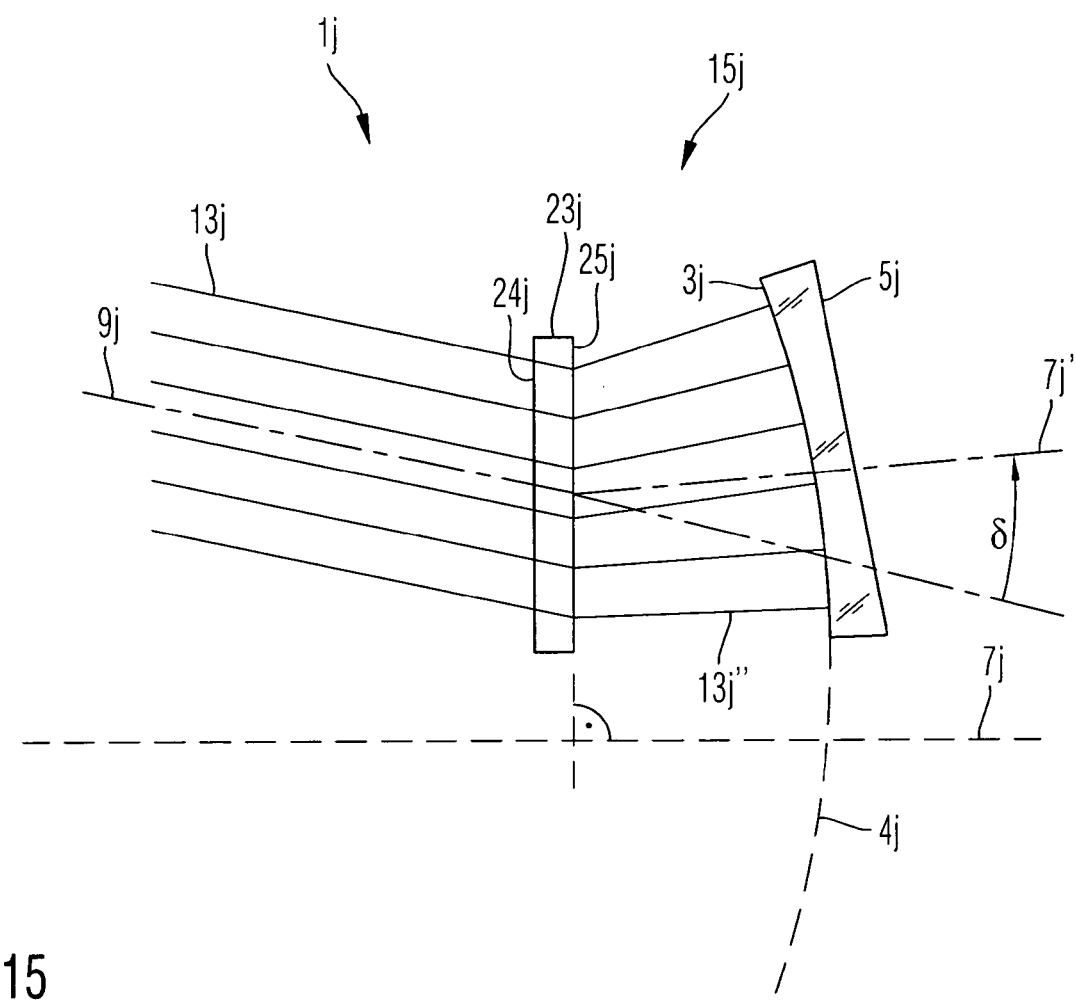

FIG. 15 shows a further embodiment of an optical system 1j for testing an optical element 5j having an optical surface 3j having an aspherical target shape 4j of rotational symmetry with respect to an axis 7j. Optical element 5j is an off-axis element since the axis 7j of rotational symmetry of the aspherical shape 4j does not coincide with a center of the optical element 5j and the optical surface 3j, respectively. In the example shown in FIG. 15, the axis 7j of rotational symmetry is disposed outside of optical element 5j. The term off-axis element should, however, also include optical elements in which the axis of rotational symmetry intersects the optical element and the optical surface provided thereon at a distance from a geometrical center of the optical element and optical surface, respectively.

An interferometer optics 15j of interferometer system 1j comprises a carrier frequency hologram 25j formed on a substrate 23j which diffracts a beam 13j of measuring light such that a diffracted beam 13j" is orthogonally incident on optical surface 3j at each location thereof. Further, an average direction of the beam 13j incident on hologram 25j is indicated by broken line 3j, and an average direction of beam 13j" emerging from the hologram 25j is indicated by a broken line 7j'. Since the hologram 25j is a carrier frequency hologram, an angle δ is formed between directions 9j and 7j'. The surface of substrate 23j on which the hologram 25j is formed is oriented under an angle of 90° with respect to the axis 7j of rotational symmetry of optical surface 3j.

Each of the embodiments illustrated with reference to FIGS. 4, 7 and 9 to 14 above may be modified such that the optical element under test is an off-axis element. Further, the interferometer system 1j shown in FIG. 15 may be modified such that one or more lenses are disposed in the beam path of measuring light upstream or downstream of the hologram.

Figure 16:
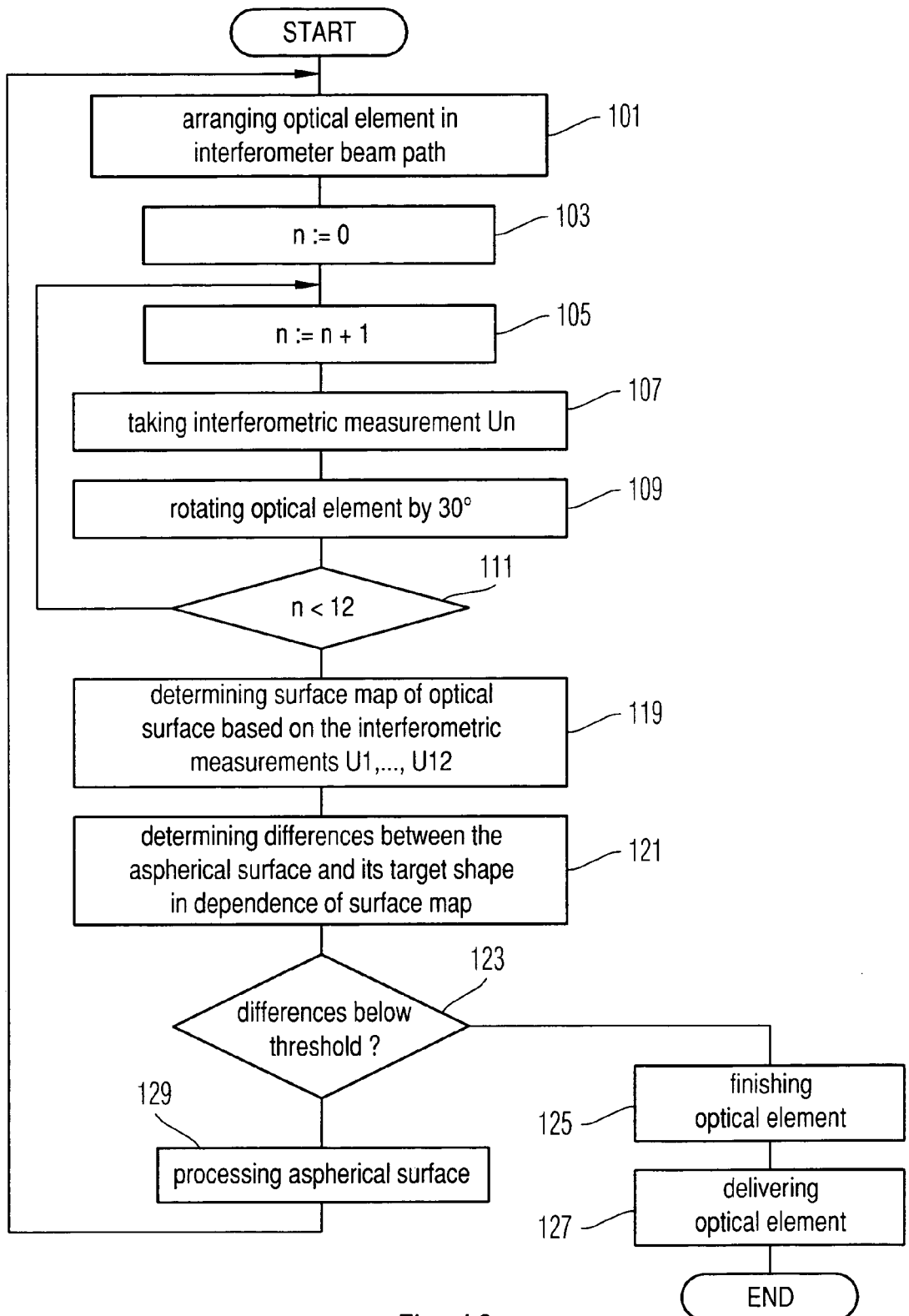
FIG. 16 is a flow chart of a method for manufacturing the optical element shown in FIG. 7.

A method of manufacturing the optical surface 3 to a high accuracy using an interferometer system as illustrated above is illustrated with reference to the flowchart shown in FIG. 16. After starting the procedure, the optical element is arranged in the beam path of beam of measuring light in a step 101, and a counter n is set to zero in a step 103. The counter is incremented in a step 105, and a first interferometric measurement $U_1$ is taken in a step 107. Thereafter, the optical element is rotated about its axis of symmetry by 30° in a step 109, and a decision 111 is made to determine whether all necessary interferometric measurements have been performed. If counter n is below 11, processing is continued at step 105 to repeatedly taking further interferometric measurements $U_n$ (step 107) and further rotating the optical element (step 109). After completing the interferometric measurements when a value of the counter n is 12 in decision step 111, a surface map of the optical surface is determined in a step 119. This determination of the surface map is based on the measurements $U_1, \ldots U_{12}$ of the optical surface 3.

Differences between the measured shape of the optical surface and its target shape are calculated in a step 121, based on the surface map determined in step 119. In a step 123, a decision is made as to whether the tested aspherical surface corresponds to the specification for the finished optical surface. If the differences are below suitably chosen thresholds, a finishing step 125 is performed on the optical surface. The finishing may include a final polishing of the surface or depositing a suitable coating, such as a reflective coating, an anti-reflective coating, and a protective coating applied to the optical surface by suitable methods, such as sputtering. The reflective coating may comprise, for example, a plurality of layers, such as ten layers of alternating dielectric materials, such as molybdenum oxide and silicon oxide. Thicknesses of such layers may be about 5 nm and will be adapted to a wavelength to be reflected from the optical surface, such that a reflection coefficient is substantially high. Finally, the reflective coating may be covered by a protective cap layer for passivating the reflective coating. The cap layer may include a layer formed by depositing materials such as ruthenium. The anti-reflective coating which is intended to reduce reflections of radiation from the optical surface of the optical element, such as a lens element, may include materials, such as magnesium fluoride, lanthanum oxide and other suitable materials. Also the anti-reflective coating may be passivated by a protective cap layer.

If the determined differences are below the thresholds in step 123, the procedure is continued at a step 129 of processing the optical surface. For this purpose, the optical element is removed from the beam path of the interferometer optics and mounted on a suitable machine tool to remove those surface portions of the optical surface at which differences between the determined surface shape and the target shape exceed the threshold. Thereafter, the procedure is continued at step 101 and the optical element is again mounted in the beam of measuring light in the interferometer system, and the measurement of the surface shape of the optical surface, determining differences from the target shape and processing is repeated until the differences are below the thresholds.

The processing may include operations such as milling, grinding, loose abrasive grinding, polishing, ion beam figuring and magneto-rheological figuring.

After the optical surface is finished in step 125, the optical element is delivered and incorporated in an optical system in a step 127. Thereafter a next optical element to be tested is mounted in the interferometer beam path in a step 101 and repeated measuring and machining of such next surface is performed until this surface fulfils the specifications.

The above threshold values will depend on the application of the optical surface in the optical system for which it is designed. For example, if the optical surface is a lens surface in an objective for imaging a reticle structure onto a resist with radiation of a wavelength λ=193 nm, such threshold value may be in a range of about 1 nm to 10 nm, and if the optical surface will be used as a mirror surface in an imaging objective using EUV (extreme ultraviolet) radiation with a wavelength of λ=13.5 nm, the threshold value will be in a region of about 0.1 nm to 1.0 nm. It is to be noted that it is not necessary that the above mentioned threshold is a constant threshold over the whole area of the optical surface. It is possible that the threshold is dependent on e.g. a distance from a center of the optical surface or some other parameters. In particular, plural thresholds may be defined each for different ranges of spatial frequencies of differences between the measured surface and its target shape.

In the above illustrated embodiments, the interferometer systems are of a Fizeau-type. It is to be noted, however, that the invention is not limited to such type of interferometer. Any other type of interferometer, such as a Twyman-Green-type of interferometer, examples of which are illustrated in chapter 2.1 of the text book edited by Daniel Malacara, Optical Shop Testing, 2nd edition, Wiley interscience Publication (1992), a Michelson-type interferometer, examples of which are illustrated in chapter 2.1 of the text book edited by Daniel Malacara, a Mach-Zehnder-type of interferometer, examples of which are illustrated in chapter 2.6 of the text book edited by Daniel Malacara, a point-diffraction type interferometer, examples of which are illustrated in U.S. Pat. No. 5,548,403 and in the article "Extreme-ultraviolet phase-shifting point-diffraction interferometer: a wavefront metrology tool with subangstrom reference-wave accuracy" by Patrick P. Naulleau et al., Applied Optics-IP, Volume 38, Issue 35, pages 7252 to 7263, December 1999, and any other suitable type of interferometer may be used.

It is further to be noted that the optical components involved in the above interferometric methods are subject to gravity during measurement. This may result in deformations of the surfaces of those components which are fixed in suitable mounts for arranging the components within the beam path of the interferometer. Even though the optical axis is oriented horizontally in FIGS. 1 to 8 and 10, it is also possible to perform the same measurements with an optical axis oriented vertically in the gravitational field. In any event, it is possible to use mathematical methods to simulate deformations of the optical components in the gravitational field. One such method is known as FEM (finite element method). All determinations of optical properties and deviations illustrated above may involve taking into account results of such mathematical methods for correcting and/or improving the determined results.

Summarized, a method of manufacturing an optical element having an optical surface of a target shape comprises an interferometric test using an interferometer optics comprising a hologram deflecting the beam of measuring light by a substantial angle or displacing an axis of symmetry of measuring light emerging from the hologram with respect to an axis of symmetry of measuring light incident on the hologram.

The present invention has been described by way of exemplary embodiments to which it is not limited. Variations and modifications will occur to those skilled in the art without departing from the scope of the present invention as recited in the appended claims and equivalents thereof.

What is claimed is:

1. A method of manufacturing an optical element having an optical surface of a target shape, the method comprising:
    generating a beam of measuring light traversing a beam deflector and a hologram, wherein the beam deflector deflects the beam of measuring light by more than 0.15°, such that measuring light having traversed the beam deflector and the hologram is incident on the optical surface, wherein a deflection angle between an average direction of the measuring light incident on the hologram and an average direction of the measuring light emerging from the hologram is greater than 0.25°, and wherein an average direction of the measuring light incident on the beam deflector is substantially parallel to the average direction of the measuring light emerging from the hologram;
    performing at least one interferometric measurement by superimposing reference light with at least a portion of the measuring light having interacted with the optical surface;
    determining deviations of the optical surface from the target shape based on the at least one interferometric measurement; and
    processing the optical surface of the optical element based on the determined deviations.

2. The method according to claim 1, wherein the beam deflector compensates deflection of the beam of measuring light by the hologram to provide that the average direction of the measuring light incident on the beam deflector is substantially parallel to the average direction of the measuring light emerging from the hologram.

3. The method according to claim 1, wherein the beam deflector comprises a prism comprising a transparent substrate having two substantially flat surfaces inclined relative to each other.

4. The method according to claim 3, wherein the hologram is provided on one of the two surfaces of the prism.

5. The method according to claim 1, wherein the beam of measuring light incident on the beam deflector is a substantially parallel beam of measuring light.

6. The method according to claim 1, wherein the beam of measuring light traverses a first lens having a first axis of rotational symmetry and disposed upstream of the beam deflector in the beam of measuring light.

7. The method according to claim 1, wherein the beam of measuring light traverses a second lens having a second axis of rotational symmetry and disposed downstream of the beam deflector in the beam of measuring light.

8. The method of claim 1, wherein the measuring light having interacted with the optical surface is measuring light reflected from the optical surface.

9. The method of claim 1, wherein the measuring light having interacted with the optical surface is measuring light traversing the optical surface.

10. The method of claim 1, wherein the performing of the at least one interferometric measurement comprises performing plural interferometric measurements by superimposing reference light with measuring light having interacted with the optical surface at plural angular positions about an axis of rotational symmetry of the optical surface.

11. The method of claim 1, wherein the target shape is an aspherical shape.

12. The method according to claim 1, wherein the processing of the optical surface of the optical element comprises at least one of milling, grinding, loose abrasive grinding, polishing, ion beam figuring, magneto-rheological figuring, and finishing the optical surface of the optical element.

13. The method according to claim 12, wherein the processing of the optical surface of the optical element comprises finishing the optical surface, and wherein the finishing comprises applying a coating to the optical surface.

14. The method according to claim 13, wherein the coating comprises at least one of a reflective coating, an anti-reflective coating and a protective coating.

15. A method of manufacturing an optical element having an optical surface of a target shape having an axis of rotational symmetry, the method comprising:
    generating a beam of measuring light traversing a first surface and a second surface of a substrate, wherein the second surface of the substrate includes a hologram deflecting the beam of measuring light such that measuring light having traversed the hologram is incident on the optical surface, wherein the substrate is disposed in a beam path of the measuring light such that the second surface is oriented towards the optical surface, wherein a deflection angle between an average direction of the measuring light incident on the hologram and an average direction of the measuring light emerging from the hologram is greater than 0.25°, and wherein the axis of rotational symmetry of the optical surface substantially orthogonally intersects a plane in which the hologram is disposed;
    performing at least one interferometric measurement by superimposing reference light with at least a portion of the measuring light having interacted with the optical surface;
    determining deviations of the optical surface from the target shape based on the at least one interferometric measurement; and
    processing the optical surface of the optical element based on the determined deviations.

16. The method according to claim 15, wherein the beam of measuring light is deflected by more than 0.15° using a beam deflector disposed upstream of the hologram in the beam of measuring light.

17. The method according to claim 15, wherein the beam of measuring light traverses a first lens having a first axis of rotational symmetry and disposed upstream of the hologram in the beam of measuring light.

18. The method according to claim 15, wherein the beam of measuring light traverses a second lens having a second axis of rotational symmetry and disposed downstream of the beam deflector in the beam of measuring light.

19. The method of claim 15, wherein the measuring light having interacted with the optical surface is measuring light reflected from the optical surface.

20. The method of claim 15, wherein the measuring light having interacted with the optical surface is measuring light traversing the optical surface.

21. The method of claim 15, wherein the performing of the at least one interferometric measurement comprises performing plural interferometric measurements by superimposing reference light with measuring light having interacted with the optical surface at plural angular positions about the axis of rotational symmetry of the optical surface.

22. The method of claim 15, wherein the target shape is an aspherical shape.

23. The method according to claim 15, wherein the processing of the optical surface of the optical element comprises at least one of milling, grinding, loose abrasive grinding, polishing, ion beam figuring, magneto-rheological figuring, and finishing the optical surface of the optical element.

24. The method according to claim 23, wherein the processing of the optical surface of the optical element comprises finishing the optical surface, and wherein the finishing comprises applying a coating to the optical surface.

25. The method according to claim 24, wherein the coating comprises at least one of a reflective coating, an anti-reflective coating and a protective coating.

26. A method of manufacturing an optical element having an optical surface of a target shape having an axis of rotational symmetry, the method comprising:

generating a beam of measuring light traversing at least one first lens having a first axis of rotational symmetry and a hologram such that the measuring light having traversed the at least one lens and the hologram is incident on the optical surface, wherein the first axis of rotational symmetry of the at least one first lens and the axis of rotational symmetry of the optical surface are substantially parallel to each other and spaced apart from each other by more than 1 mm;

performing at least one interferometric measurement by superimposing reference light with at least a portion of the measuring light having interacted with the optical surface;

determining deviations of the optical surface from the target shape based on the at least one interferometric measurement; and processing the optical surface of the optical element based on the determined deviations.

27. The method according to claim 26, wherein the axis of rotational symmetry of the optical surface substantially orthogonally intersects a plane in which the hologram is disposed.

28. The method according to claim 26, wherein the beam of measuring light traverses a second lens having a second axis of rotational symmetry and disposed downstream of the hologram in the beam of measuring light.

29. The method of claim 26, wherein the measuring light having interacted with the optical surface is measuring light reflected from the optical surface.

30. The method of claim 26, wherein the measuring light having interacted with the optical surface is measuring light traversing the optical surface.

31. The method of claim 26, wherein the performing of the at least one interferometric measurement comprises performing plural interferometric measurements by superimposing reference light with measuring light having interacted with the optical surface at plural angular positions about an axis of rotation of the optical surface.

32. The method of claim 26, wherein the target shape is an aspherical shape.

33. The method according to claim 26, wherein the processing of the optical surface of the optical element comprises at least one of milling, grinding, loose abrasive grinding, polishing, ion beam figuring, magneto-rheological figuring, and finishing the optical surface of the optical element.

34. The method according to claim 33, wherein the processing of the optical surface of the optical element comprises finishing the optical surface, and wherein the finishing comprises applying a coating to the optical surface.

35. The method according to claim 34, wherein the coating comprises at least one of a reflective coating, an anti-reflective coating and a protective coating.

* * * * *